United States Patent [19]
Hashimoto et al.

[11] Patent Number: 5,777,779
[45] Date of Patent: Jul. 7, 1998

[54] ELECTROCHROMIC DEVICE AND METHOD FOR MANUFACTURING THE SAME

[75] Inventors: Shigeru Hashimoto, Yokohama; Junji Terada, Hiratsuka, both of Japan

[73] Assignee: Canon Kabushiki Kaisha, Tokyo, Japan

[21] Appl. No.: 722,952

[22] Filed: Sep. 27, 1996

[30] Foreign Application Priority Data

Sep. 29, 1995 [JP] Japan ................. 7-275053

[51] Int. Cl.⁶ ........................................ G02F 1/153
[52] U.S. Cl. ........................................ 359/270
[58] Field of Search ........................ 359/269, 270, 359/273, 274

[56] References Cited

U.S. PATENT DOCUMENTS

| | | | |
|---|---|---|---|
| 4,294,520 | 10/1981 | Inoue et al. | 350/357 |
| 4,350,414 | 9/1982 | Takahashi et al. | 350/357 |
| 4,465,339 | 8/1984 | Baucke et al. | 359/267 |
| 4,508,792 | 4/1985 | Ishiwata | 428/702 |
| 4,652,090 | 3/1987 | Uchikawa et al. | 350/357 |
| 5,011,582 | 4/1991 | Oshikawa et al. | 204/140 |

FOREIGN PATENT DOCUMENTS

| | | |
|---|---|---|
| 0 448260 A2 | 9/1991 | European Pat. Off. . |
| 56-130723 | 10/1981 | Japan . |
| 56-130763 | 10/1981 | Japan . |

OTHER PUBLICATIONS

Patent Abstracts of Japan, JP59061820, Apr. 9, 1984.
Patent Abstracts of Japan, JP60011577, Jan. 21, 1985.
Patent Abstracts of Japan, JP60951720, Apr. 8, 1994.
Patent Abstracts of Japan, JP63294536, Dec. 1, 1988.
Patent Abstracts of Japan, JP4107427, Apr. 8, 1992.

*Primary Examiner*—Georgia Y. Epps
*Assistant Examiner*—Dawn-Marie Bey
*Attorney, Agent, or Firm*—Fitzpatrick, Cella, Harper & Scinto

[57] ABSTRACT

An electrochromic device and a method for manufacturing same, which device has at least a pair of opposed transparent electroconductive layers, a first transparent ion conductive layer provided between the pair of opposed electroconductive layers, a second transparent ion conductive layer adjacent to the first ion conductive layer, a reductive coloring electrochromic layer adjacent to the second ion conductive layer, wherein the first transparent ion conductive layer is formed in an atmosphere containing water vapor and the second transparent ion conductive layer is formed in an atmosphere containing oxygen. Thereby an electrochromic device can be provided, which device exhibits excellent durability when being driven at a high contrast ratio and high resistance to such environments as high temperature and humidity.

18 Claims, 5 Drawing Sheets

ELECTROCHROMIC DEVICE AND METHOD FOR MANUFACTURING THE SAME

BACKGROUND OF THE INVENTION

1. Field of the Invention

The present invention relates to an electrochromic device and a method for manufacturing the same, which device is used for a display device, a transmittance-variable filter, etc.

2. Description of the Related Art

Application of an electrochromic device (EC device), colored or colorless (approximately transparent), corresponding to an applied electrical field to a display device, a transmittance-variable filter, etc. has been investigated, because the EC device, compared with ordinary liquid crystal devices and the like, has high optical transmittance in a colorless state, is unaffected by polarization, and exhibits a memory effect.

FIG. 5 shows a complementary type EC device which is a known example of the aforementioned EC device and is described, e.g., in Japanese Patent Publication No. 60-31355 and U.S. Pat. No. 4,350,414. Five layers are provided on a transparent substrate 101 of the device in such a way that a reductive coloring electrochromic layer 105 composed of tungsten oxide and/or molybdenum oxide, an insulating layer 104 made of tantalum pentoxide, and an oxidative coloring electrochromic layer 103 substantially composed of iridium hydroxide and/or nickel hydroxide are provided between a pair of electrodes (transparent electroconductive layers) 102a and 102b.

In addition, another complementary type EC device having five layers is disclosed e.g., in Japanese Patent Publication No. 5-33373 and U.S. Pat. No. 4,652,090. The device has a transparent dispersion layer which comprises a metal iridium, iridium oxide, or iridium hydroxide disperse phase and a transparent solid dispersion medium as the aforementioned oxidative coloring electrochromic layer 103.

Further, Japanese Laid-Open Patent Application No. 56-130763 discloses a method for manufacturing an EC device in order to improve coloring speed and durability in the driving state, that is, durability during the repeated alternations between the colored and colorless state undergone by an EC device (hereinafter referred to simply as durability). The method comprises forming at least one layer selected from the group consisting of the transparent electroconductive layer, the oxidative coloring electrochromic layer, and the insulating layer by physical vapor deposition, in an atmosphere containing water vapor. This method is said to be effective to improve coloring speed.

In the EC device prepared by the method, however, the bond between the insulating layer and the reductive coloring electrochromic layer is weak. Therefore, in the above-described EC device there is peeling between the layers and slow response speed (coloring speed or speed of loss of color) when driven under such a condition that the contrast ratio (optical transmittance during loss of color/optical transmittance during coloring) is 10 or more or when the EC device is allowed to stand for a long time in high temperature and humidity.

SUMMARY OF THE INVENTION

An object of the present invention is to provide an EC device and a method for manufacturing the same, which device exhibits excellent durability when being driven at a high contrast ratio and having high resistance to such environments as high temperature and humidity.

According to the present invention, there is provided an electrochromic device having at least a pair of opposed transparent electroconductive layers, a first transparent ion conductive layer provided between the pair of opposed electroconductive layers, a second transparent ion conductive layer adjacent to the first ion conductive layer, a reductive coloring electrochromic layer adjacent to the second ion conductive layer, wherein the first transparent ion conductive layer is formed in an atmosphere containing water vapor and the second transparent ion conductive layer is formed in an atmosphere containing oxygen.

The present invention further provides a method for manufacturing an electrochromic device, the electrochromic device having at least a pair of opposed transparent electroconductive layers, a first transparent ion conductive layer provided between the pair of opposed electroconductive layers, a second transparent ion conductive layer adjacent to the first ion conductive layer, a reductive coloring electrochromic layer adjacent to the second ion conductive layer, the method having a step of forming the first transparent ion conductive layer in an atmosphere containing water vapor; and a step of forming the second transparent ion conductive layer in an atmosphere containing oxygen.

Further objects, features and advantages of the present invention will become apparent from the following description of the preferred embodiments with reference to the attached drawings.

DESCRIPTION OF THE PREFERRED EMBODIMENT

Figure 1:
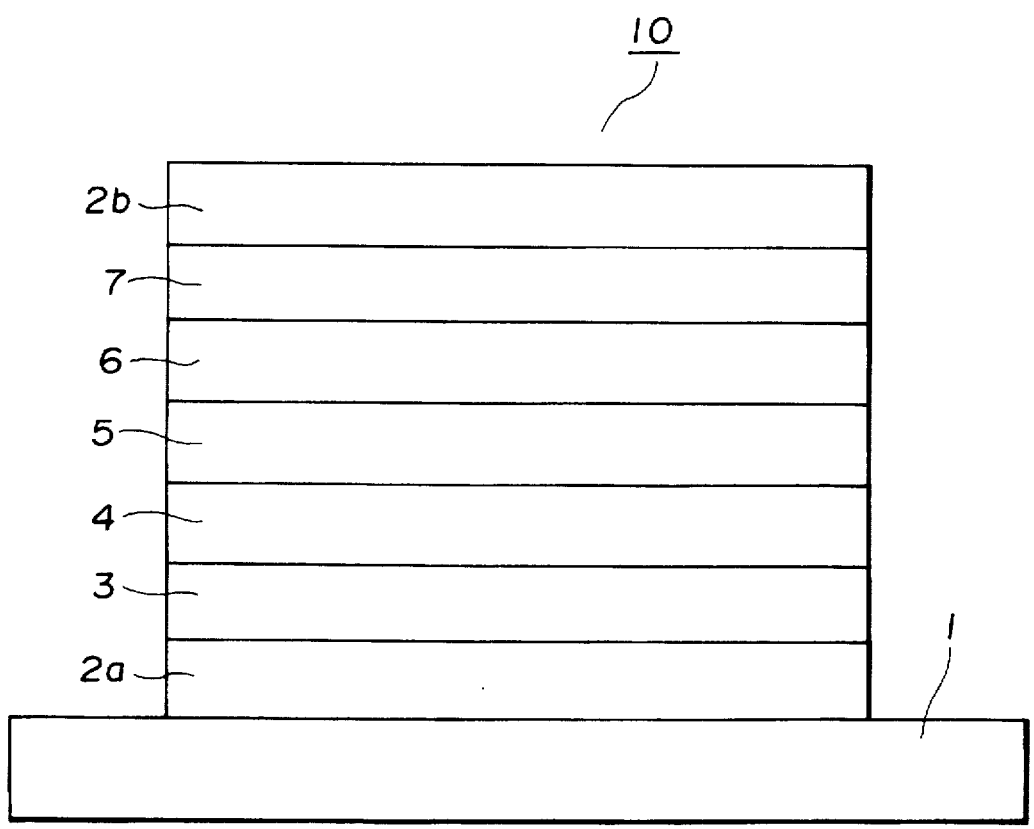
FIG. 1 is a schematic sectional diagram showing a layer structure of an electrochromic device in an embodiment according to the present invention.

FIG. 1 illustrates a layer structure of an EC device 10 used in an embodiment of the present invention.

A transparent substrate 1 of the EC device 10 is provided with a transparent electrode (transparent electroconductive layer) 2a, an oxidative coloring electrochromic layer 3, a layer 4 (referred as to a mixture layer hereinafter) composed of a mixture of an oxidative coloring electrochromic material and a metal oxide, a first transparent ion conductive layer 5, a second transparent ion conductive layer 6, a reductive coloring electrochromic layer 7, and a transparent electrode (transparent electroconductive layer) 2b thereon in that order. That is, the EC device 10 employs a seven-layer structure instead of the five-layer structure applied to conventional EC devices. In these layers, the oxidative coloring electrochromic layer 3 and/or the mixture layer 4 can be omitted. However, the presence of each layer improves many properties.

Although the transparent substrate 1 is preferably formed of glass, various transparent materials such as plastic may be employed depending on the intended use of the EC device. In addition, an anti-reflection coating (ARC) is preferably provided on the surface of the transparent substrate 1 which is opposite to the transparent electrode 2a, by forming a monolayer of a dielectric material including $Al_2O_3$, $TiO_2$, $MgF_2$ and the like, or multi-layers composed of a plurality of different kinds of monolayers.

Such materials as $In_2O_3$, $SnO_2$, and ITO (indium tin oxide) can be used for transparent electrode 2a and 2b. Considering an optical property, i.e., optical transmittance, electric resistance and others, ITO is preferred, and ITO in which the ratio of $In_2O_3$ to $SnO_2$ is approximately 95:5 is most preferred. The electric resistance of last-formed transparent electrode (2b in this embodiment) tends to be bigger than the electric resistance of first-formed transparent electrode (2a in this embodiment). Therefore, the last-formed transparent electrode is preferably thicker than the first-formed transparent electrode.

The oxidative coloring electrochromic layer 3 preferably contains at least one element selected from the group consisting of Co, Ni, Fe, Ir, Cu, Ru, Rh, Pd, Pt, Cr, Dy, and Er. The element exists as a simple metal (M), an oxide $(MO_X)$, a hydroxide $(M(OH)_X)$, an oxyhydroxide $(MO_X(OH)_Y)$, or a mixture thereof. Taking into consideration optical properties and durability, the oxidative coloring electrochromic layer 3 is more preferably composed of iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, or a mixture thereof.

The preferable thickness range of the oxidative coloring electrochromic layer 3 is from 1 nm to 50 nm. The durability decreases if the thickness is under 1 nm, and the absorbance increases when the thickness is above 50 nm.

The oxidative coloring electrochromic material used for the mixture layer 4 preferably contains at least one element selected from the group consisting of Co, Ni, Fe, Ir, Cu, Ru, Rh, Pd, Pt, Cr, Dy, and Er. The element exists as a simple metal (M), an oxide $(MO_X)$, a hydroxide $(M(OH)_X)$, an oxyhydroxide $(MO_X(OH)_Y)$, or a mixture thereof. Taking into consideration optical properties and repeated durability, the oxidative coloring electrochromic material is more preferably iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, or a mixture thereof.

Metal oxide having high optical transmittance is preferably used for the mixture layer 4. Further, it is preferred that such metal oxide does not exhibit electrochromism, particularly reductive coloring electrochromism when a common voltage is applied thereto. Practically, the metal oxide is preferably selected from the group consisting of $TiO_2$, $Ta_2O_5$, $ZrO_2$, $HfO_2$, $Y_2O_3$, $Al_2O_3$, $SiO_2$, $SnO_2$, or mixture thereof.

The weight ratio of an oxidative coloring electrochromic material to a metal oxide in the mixture layer 4 is preferably $0.02 \leq$ (oxidative coloring electrochromic material/metal oxide) $\leq 1$. The absorbance increases if the weight ratio is above 1, and both the durability and the coloring speed (response speed) decrease when the ratio is under 0.02.

The preferable thickness of the mixture layer 4 is in a range of from 10 nm to 5,000 nm, considering the response speed and the optical transmittance. The absorbance increases if the thickness of the layer exceeds 5,000 nm, and both the durability and the coloring speed (response speed) decrease when the thickness of the layer is under 10 nm.

The first transparent ion conductive layer 5 and the second transparent ion conductive layer 6 are preferably composed of $Ta_2O_5$, $ZrO_2$, $SiO_2$, $MgF_2$, or a mixture thereof. Considering optical properties and repeated durability, $Ta_2O_5$ is most preferred among them. The first transparent ion conductive layer 5 is formed in an atmosphere containing water vapor, and the second transparent ion conductive layer 6 is formed in an atmosphere containing oxygen.

The reductive coloring electrochromic layer 7 is preferably composed of $WO_3$, $MoO_3$, $Nb_2O_5$, or a mixture thereof. Considering the coloring speed, $WO_3$ is more preferable among them. In addition, the layer 7 composed of a mixture of $WO_3$ and $MoO_3$ can show a black color in the colored state.

The preferable thickness of other layers, except the oxidative coloring electrochromic layer 3 and the mixture layer 4, is in a range of from 1 nm to 5,000 nm, depending on the required optical transmittance, durability, and the like.

While the EC device 10 of this embodiment has the transparent substrate 1 provided with the transparent electrode 2a, the oxidative coloring electrochromic layer 3, the mixture layer 4, the first transparent ion conductive layer 5, the second transparent ion conductive layer 6, the reductive coloring electrochromic layer 7, and the transparent electrode 2b thereon in that order, those layers may be piled up in the reverse order, i.e., the transparent electrode 2b, the reductive coloring electrochromic layer 7, the second transparent ion conductive layer 6, the first transparent ion conductive layer 5, the mixture layer 4, the oxidative coloring electrochromic layer 3, and the transparent electrode 2a.

A method for manufacturing the EC device 10 of this embodiment will be described as follows.

First, the transparent electrode (transparent electroconductive layer) 2a is prepared on the transparent substrate 1 by any known deposition process, such as vacuum evaporation, sputtering, ion plating, and CVD, in known temperature.

Then, the oxidative coloring electrochromic layer 3 is formed on the transparent electrode 2a by any known deposition process, such as vacuum evaporation, sputtering, ion plating, and CVD.

Subsequently, the mixture layer 4 is prepared on the oxidative coloring electrochromic layer 3, desirably, by sputtering in an atmosphere of water vapor, oxygen, a mixture of water vapor and oxygen, or a mixture of water vapor and argon. It is preferred that sputtering proceeds in an atmosphere of water vapor, a mixture of water vapor and oxygen, or a mixture of water vapor and argon, and more preferably, in an atmosphere of water vapor, or a mixture of water vapor and argon in a gas pressure range of 1 Pa to 20 Pa with a mixture ratio (flow ratio) of water vapor to argon of 0.5 or more. When the sputtering proceeds in an atmosphere of water vapor or a mixture of water vapor and argon at a mixture ratio (flow ratio) of above 20, the gas pressure is preferably 10 Pa or less. If the mixture ratio (flow ratio) of water vapor to argon ranges from 0.5 to 20, the gas pressure is preferably 20 Pa or less. A gas pressure larger than the aforementioned values results in a slower deposition speed, which impairs productivity, and a harmful influence on the vacuum pump, e.g., cryo-pump and diffusion pump, of the evacuation system. When the gas pressure is under 1 Pa or the mixture ratio (flow ratio) of water vapor to argon is under 0.5, the absorbance of the mixture layer 4 increases. Further, stable discharge cannot be obtained if the gas pressure is under 1 Pa. A more preferable sputtering condition is a gas pressure in a range of from 1 Pa to 10 Pa and a mixture ratio (flow ratio) of water vapor to argon in a range of from 0.5 to 20.

In above-described steps, the oxidative coloring layer 3 and the mixture layer 4 are preferably deposited under room temperature by sputtering. In sputtering process, however, the heat arising from plasma raises the temperature. Generally, the raised temperature is under 100° C. Naturally, suitable temperatures change according to chosen deposition processes.

Then, the first transparent ion conductive layer 5 and the second transparent ion conductive layer 6 are prepared in that order by the above-mentioned known deposition techniques. In the preparation, the first transparent ion conductive layer 5 is formed in an atmosphere containing water vapor, desirably in a gas pressure range of $1 \times 10^{-3}$ Pa to $1 \times 10^{-1}$ Pa, and the second transparent ion conductive layer 6 is formed in an atmosphere containing oxygen, desirably in a gas pressure range of $1 \times 10^{-3}$ Pa to $1 \times 10^{-1}$ Pa. Preferably, these transparent ion conductive layers are deposited by vacuum evaporation with a substrate temperature above 200° C. in order to increase the bonding power between these transparent ion conductive layers and the reductive coloring electrochromic layer formed next. Considering the heat-resistance of the substrate like a glass, the substrate temperature is preferably under 400° C.

Subsequently, the reductive coloring electrochromic layer 7 and the transparent electrode (transparent electroconductive layer) 2b are prepared in that order by the above-mentioned known deposition techniques so as to produce the EC device 10. In the preparation, the reductive coloring electrochromic layer 7 is preferably deposited by vacuum evaporation with a substrate temperature above 200° C. in order to increase the bonding power between these transparent ion conductive layers and the reductive coloring electrochromic layer. Considering the heat-resistance of the substrate like a glass, the substrate temperature is preferably under 400° C.

Figure 2:
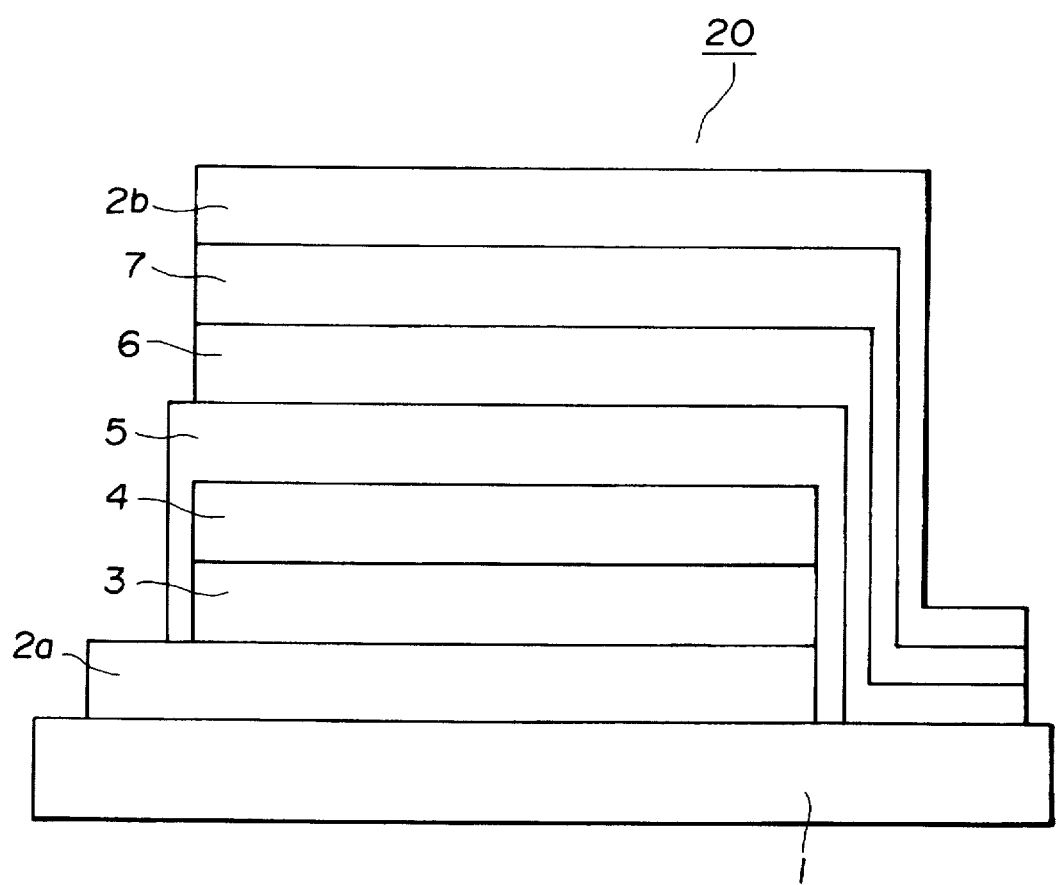
FIG. 2 is a schematic sectional diagram showing a layer structure of modified example of an electrochromic device in an embodiment according to the present invention.

An EC device 20 shown in FIG. 2 is a modified example of the EC device 10 in this embodiment and will be explained in the following.

As in shown in FIG. 2, one lateral side, which means the left side in the figure, of a transparent electrode (transparent electroconductive layer) 2a is extended outward compared with the other layers. The extended portion is utilized for connecting to a power source through a wire. The opposite lateral side, which means the right side in FIG. 2, of a transparent electrode (transparent electroconductive layer) 2b is extended to be near substrate 1 along the lateral surfaces of layers 7, 6, 5, 4, 3, and 2a so as to form a connecting portion on the substrate 1. In the EC device 20, it is necessary to prevent electrons from moving between the transparent electrode 2b and other layers 4, 3, 2a. For this purpose, e.g., the lateral side of the transparent ion conductive layers 5, 6 are extended to the substrate 1 along lateral surfaces of the layers 4, 3, and 2a. Although the lateral side of the reductive coloring electrochromic layer 7 is similarly extended to the substrate 1 in FIG. 2, it is not always needed.

The above-described arrangement of the EC device 20 is provided by shifting the mask position or using plural masks having deferent shapes each other in the steps for preparing layers 2a, 3, 4, 5, 6, 7, 2b, for example, in depositing.

Following are descriptions about preferable mask position or shape of an aperture of a mask to form each of the layers. An aperture of a mask for layer 2a corresponds to an effective optical modulation region and one extended portion. An aperture of a mask for layer 3 and layer 4 corresponds to the effective optical modulation region. An aperture of a mask for layer 5 corresponds to the effective optical modulation region and a portion for preventing electrons from moving between the layer 2b and layers 4, 3, 2a. An aperture of a mask for layers 6, 7, 2b corresponds to the effective optical modulation region and the other extended portion. The mask for layers 6, 7, 2b may be same in the shape as the mask for layer 2a, and, in that case, the mask for layers 6, 7, 2b should be used in opposite direction (with approximately 180 degrees rotation).

In the foregoing embodiments, each layer may contain some impurities unless the function of the layer is impaired. The tolerable level of the impurities is 1% or less.

Figure 3:
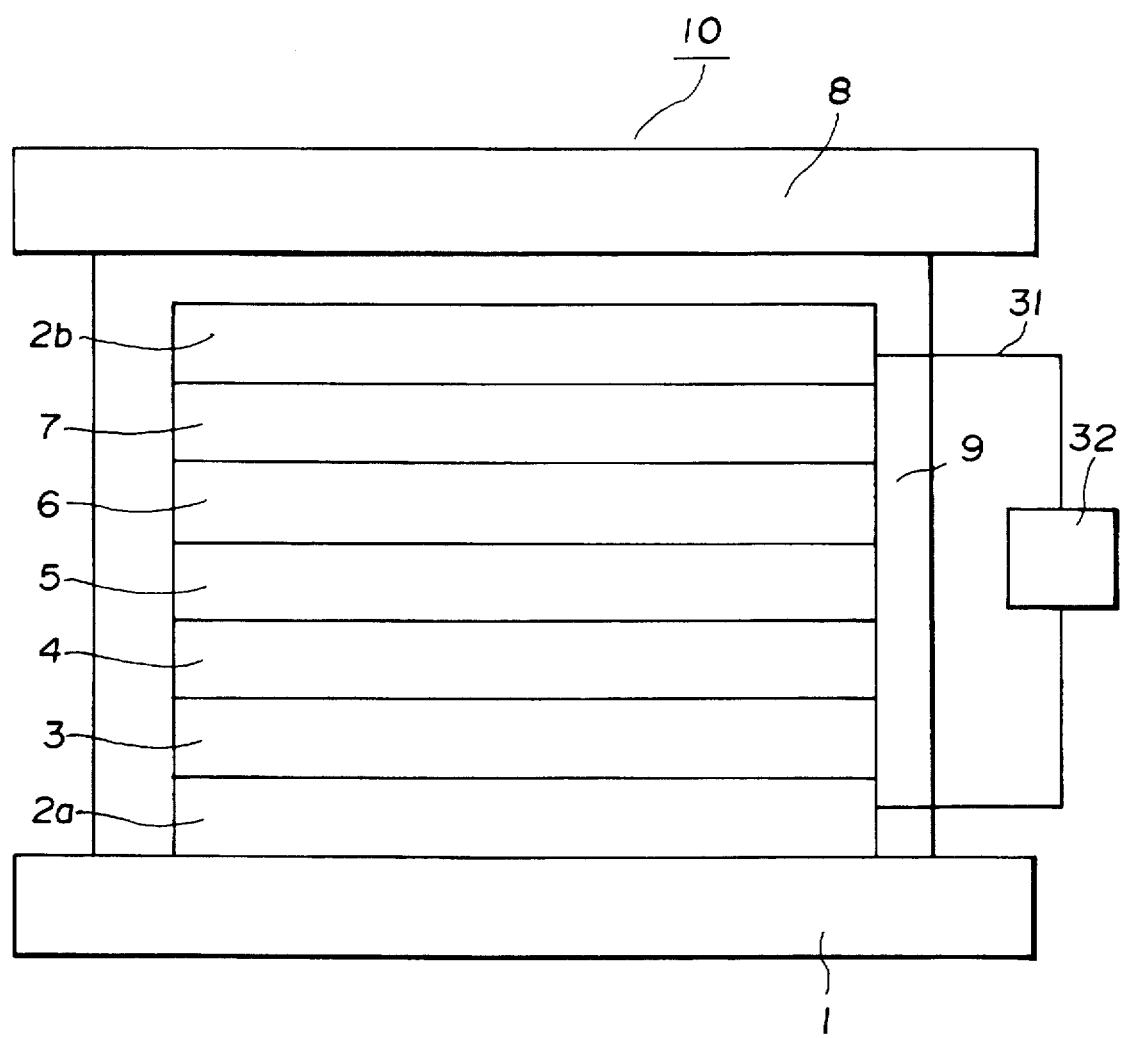
FIG. 3 is a schematic sectional diagram showing a packaged electrochromic device in an embodiment according to the present invention.

The EC device shown in the above embodiments is used after being packaged. FIG. 3 illustrates a schematic sectional diagram of the packaged EC device 10.

Transparent electrodes 2a and 2b of the EC device 10 connect to a power source 32 through a wire 31. The space between a transparent substrate 8 and the facing transparent electrode 2b and the periphery of the layers provided between the transparent substrates 1 and 8 are encapsulated with a transparent resin 9. In other words, the EC device 10 is encapsulated by the resin 9. The resin 9 serves to adhere the transparent substrates 1 and 8, as well as to prevent the oxidative coloring electrochromic layer 3, the mixture layer 4, the transparent ion conductive layers 5, 6, and the reductive coloring electrochromic layer 7 from being exposed to the outside air. Connecting portions of the transparent electrodes 2a and 2b may be exposed to the outside air. The transparent substrate 8 is similar to the above-mentioned transparent substrate 1, and is preferably provided with an ARC on a surface opposite to the transparent electrode 2b. The layers of EC device 10 preferably absorb water before the encapsulation.

Figure 4:
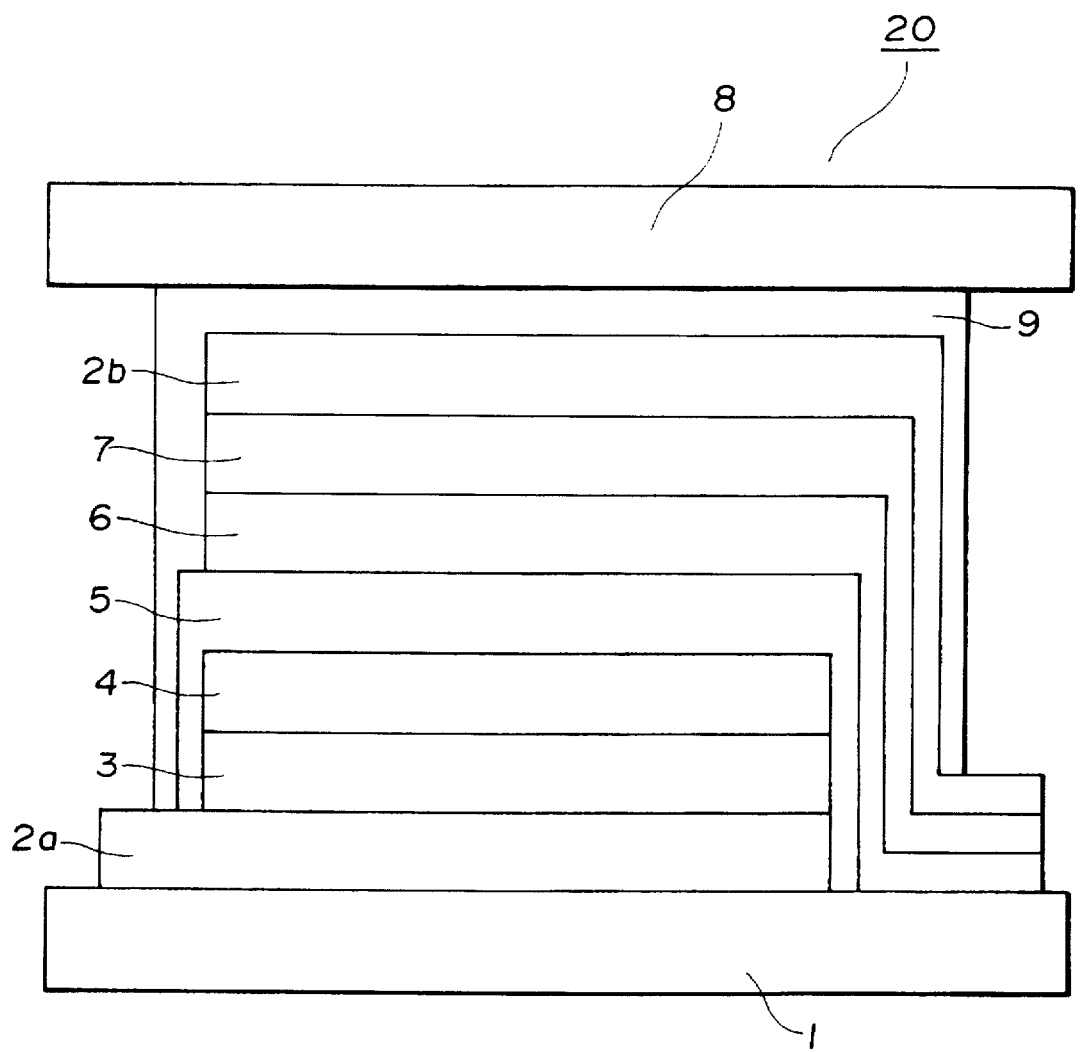
FIG. 4 is a schematic sectional diagram showing a modified example of a packaged electrochromic device in an embodiment according to the present invention.
Figure 5:
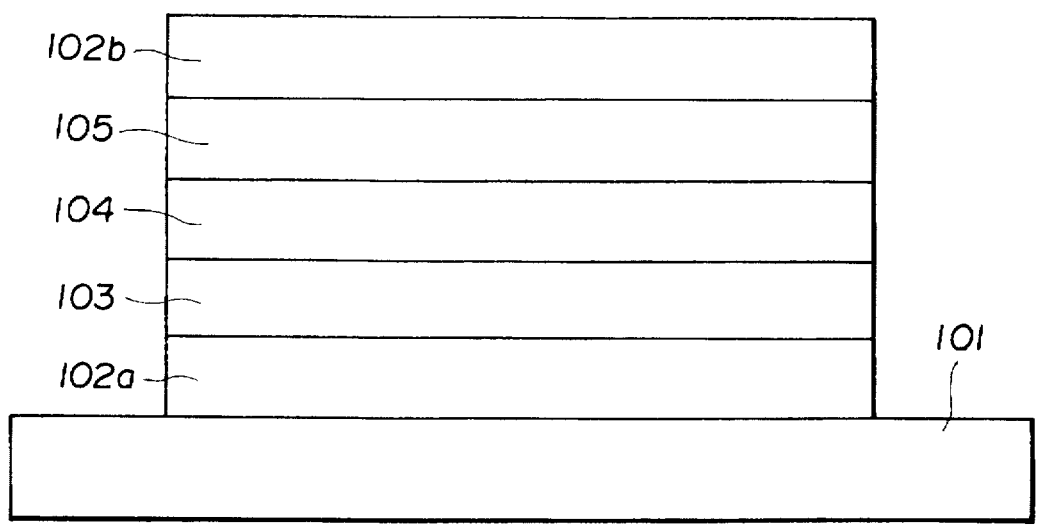
FIG. 5 is a schematic sectional diagram showing a layer structure of a conventional electrochromic device composed of five layers.

FIG. 4 illustrates a schematic sectional diagram of the packaged EC device 20, wherein wires and power source are not shown.

Except the connecting portions of the transparent electrodes 2a and 2b, which portions allow wiring, each layer of the EC device 20 is encapsulated by the resin, as shown in FIG. 4.

Examples and comparative examples will be described as follows.

EXAMPLE 1

On a transparent glass substrate having its non-deposition surface provided with an ARC, ITO was vacuum-evaporated at a substrate temperature of 300° C. and at an $O_2$ partial pressure of $5 \times 10^{-2}$ Pa, to form a transparent electrode (transparent electroconductive layer) 150 nm thick as the first layer.

Then, deposition on the transparent electrode proceeded by radio-frequency sputtering using iridium metal as a target under conditions such that the substrate was at room temperature and the $O_2$ partial pressure was 1 Pa; thereby an oxidative coloring electrochromic layer 5 nm thick was formed as the second layer. Power of 130 W was input to the iridium metal target. The oxidative coloring electrochromic layer mainly contains iridium oxide.

As the third layer, a mixture layer 400 nm thick comprising an oxidative coloring electrochromic material and a metal oxide was deposited on the oxidative coloring electrochromic layer by radio-frequency co-sputtering using iridium metal and tin metal as targets under conditions such that the substrate at room temperature, the mixture pressure of water vapor and argon was 5 Pa, and the flow ratio of water vapor to argon was 3. Power of 130 W and 700 W was input to the iridium metal target and the tin metal target, respectively. The resulting layer is a mixture of an oxidative coloring electrochromic material, comprising iridium oxide and iridium hydroxide, with a metal oxide which is tin oxide. The layer also contains iridium metal.

On the mixture layer, tantalum pentoxide was vacuum-evaporated at a substrate temperature of 300° C. and at an $H_2O$ partial pressure of $3\times10^{-2}$ Pa, thereby a first transparent ion conductive layer 250 nm thick was formed as the fourth layer.

On the first transparent ion conductive layer, tantalum pentoxide was vacuum-evaporated at a substrate temperature of 300° C. and at an $O_2$ partial pressure of $3\times10^{-2}$ Pa, thereby a second transparent ion conductive layer 50 nm thick was formed as the fifth layer.

Then, tungsten trioxide was vacuum-evaporated on the second transparent ion conductive layer at a substrate temperature of 300° C. and at an $O_2$ partial pressure of $5\times10^2$ Pa, thereby a reductive coloring electrochromic layer 1,000 nm thick was formed as the sixth layer.

Finally, ITO was deposited on the reductive coloring electrochromic layer by radio-frequency ion plating at a substrate temperature of 300° C. and at an $O_2$ partial pressure of $3\times10^{-2}$ Pa, using the radio-frequency power of 150 W; thereby a transparent electrode (transparent electroconductive layer) 450 nm thick was formed as the seventh layer.

In the above-mentioned manner, an EC device with the 7 layers shown in FIG. 1 could be obtained. The resulting EC device was resin-encapsulated as shown in FIG. 3.

Durability was evaluated as follows: A voltage of ±2 V was repeatedly applied between the transparent electrodes and maintained a contrast ratio, during loss of color/during addition of color, of the mean optical transmittance 10 or more in a wavelength range of 400 nm to 700 nm; the number of times required for 10% decrease in the optical transmittance and the number of times required for 50% decrease in the response speed were measured; and the smaller number was used for the evaluation of the repeated durability. This evaluation method was applied to the following examples and the comparative example.

Based on measurements made, the repeated durability was more than five hundred thousand times. After permitting the EC device to stand in a condition such as 70° C., 85% R. H. for 1,000 hours, no change could be found in the property and the appearance.

EXAMPLE 2

An EC device was prepared in a manner similar to example 1, except that the sixth layer was formed from a mixture of tungsten trioxide and molybdenum trioxide at a weight ratio of 9:1, instead of tungsten trioxide alone. The EC device used for this example was similar to that shown in FIG. 2, rather than that shown in FIG. 1. The EC device was resin-encapsulated, and then, subjected to the same evaluation as example 1.

Measurements showed the repeated durability was more than five hundred thousand times. After permitting the EC device to stand in a condition such as 70° C., 85% R. H. for 1,000 hours, no changes could be found in the property and the appearance of the EC device.

EXAMPLE 3

An EC device was prepared in a manner similar to example 1 except that the fourth layer, fifth layer, sixth layer, and the seventh layer were formed at a substrate temperature of 150° C. The EC device was resin-encapsulated, and then, subjected to the same evaluation as example 1.

Measurement showed the repeated durability was one hundred and twenty thousand times (50% decrease in the response speed). After permitting the EC device to stand in a condition such as 70° C., 85% R. H. for 1,000 hours, peeling off between the layers was sometimes found.

Comparative Example 1

An EC device was prepared by a way similar to example 1 except that the fifth layer (the second transparent ion conductive layer) was not formed. The EC device was resin-encapsulated, and then, subjected to the same evaluation as example 1.

From the measurement, the repeated durability was ten thousand times (50% decrease in the response speed). After permitting the EC device to stand in a condition such as 70° C., 85% R. H. for 1,000 hours, there was almost always found peeling off between the layers.

As is understood from the above description, the present invention provides an EC device and a method for manufacturing the same, which device exhibits excellent durability when being driven at a high contrast ratio and high resistance to such an environment as high temperature and humidity.

The invention may be embodied in other specific forms without departing from the spirit or essential characteristics thereof. The present embodiments and examples are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. An electrochromic device comprising at least;

a pair of opposed transparent electroconductive layers, a first transparent ion conductive layer provided between the pair of opposed electroconductive layers, a second transparent ion conductive layer adjacent to the first ion conductive layer, a reductive coloring electrochromic layer adjacent to the second ion conductive layer, wherein the first transparent ion conductive layer is formed in an atmosphere containing water vapor and the second transparent ion conductive layer is formed in an atmosphere containing oxygen.

2. An electrochromic device as set forth in claim 1, wherein said reductive coloring electrochromic layer is formed in an atmosphere containing oxygen.

3. An electrochromic device as set forth in claim 1, comprising a transparent substrate adjacent to at least one outer surface of said pair of opposed transparent electroconductive layers.

4. An electrochromic device as set forth in claim 3, wherein said transparent substrate is provided with an anti-reflection coating comprising a dielectric material on a surface reverse to said opposed transparent electroconductive layers.

5. An electrochromic device as set forth in claim 4, wherein said dielectric material comprises at least one selected from the group consisting of $Al_2O_3$, $TiO_2$, and $MgF_2$.

6. An electrochromic device as set forth in claim 1, wherein said first transparent ion conductive layer and second ion conductive layer comprise at least one compound selected from the group consisting of $Ta_2O_5$, $ZrO_2$, $SiO_2$, and $MgF_2$.

7. An electrochromic device as set forth in claim 1, wherein said first transparent ion conductive layer and second ion conductive layer comprise $Ta_2O_5$.

8. An electrochromic device as set forth in claim 1, wherein said reductive coloring electrochromic layer comprises at least one compound selected from the group consisting of $WO_3$, $MoO_3$, and $Nb_2O_5$.

9. An electrochromic device as set forth in claim 1, wherein said reductive coloring electrochromic layer comprises $WO_3$.

10. An electrochromic device as set forth in claim 1, wherein said reductive coloring electrochromic layer comprises a mixture of $WO_3$ and $MoO_3$.

11. An electrochromic device as set forth in claim 1, comprising a layer containing a oxidative coloring electrochromic material between said pair of opposed transparent electroconductive layers.

12. An electrochromic device as set forth in claim 1, comprising a layer containing a oxidative coloring electrochromic material and a metal oxide between said pair of opposed transparent electroconductive layers.

13. An electrochromic device as set forth in claim 1, comprising a oxidative coloring electrochromic layer, and a layer containing a oxidative coloring electrochromic material and a metal oxide, said layers provided between said pair of opposed transparent electroconductive layers.

14. An electrochromic device as set forth in claim 1, a pair of opposed transparent electroconductive layers, and a reductive coloring electrochromic layer, wherein a last-formed transparent electroconductive layer is thicker than a first-formed transparent electroconductive layer.

15. An electrochromic device comprising at least;

a pair of opposed transparent substrates provided with a pair of opposed transparent electroconductive layers therebetween; and a first transparent ion conductive layer provided between the pair of opposed electroconductive layers, a second transparent ion conductive layer adjacent to the first ion conductive layer, and a reductive coloring electrochromic layer adjacent to the second ion conductive layer, wherein the first transparent ion conductive layer is formed in an atmosphere containing water vapor and the second transparent ion conductive layer is formed in an atmosphere containing oxygen; and at least said first transparent ion conductive layer, said second transparent ion conductive layer, and said reductive coloring electrochromic layer are encapsulated by a resin.

16. A method for manufacturing an electrochromic device, said device comprising at least a pair of opposed transparent electroconductive layers, a first transparent ion conductive layer provided between the pair of opposed electroconductive layers, a second transparent ion conductive layer adjacent to the first ion conductive layer, and a reductive coloring electrochromic layer adjacent to the second ion conductive layer, said method comprising;

a step of forming the first transparent ion conductive layer in an atmosphere containing water vapor; and a step of forming the second transparent ion conductive layer in an atmosphere containing oxygen.

17. A method for manufacturing an electrochromic device as set forth in claim 16, which method further comprises a step of forming said reductive coloring electrochromic layer in an atmosphere containing oxygen.

18. A method for manufacturing an electrochromic device as set forth in claim 16, which method further comprises steps of forming said first transparent ion conductive layer, said second transparent ion conductive layer, and said reductive coloring electrochromic layer by vacuum evaporation with a substrate temperature range of from 200° C. to 400° C.

* * * * *

UNITED STATES PATENT AND TRADEMARK OFFICE
CERTIFICATE OF CORRECTION

PATENT NO. :  5,777,779

DATED       :  July 7, 1998

INVENTOR(S):  SHIGERU HASHIMOTO ET AL.

It is certified that error appears in the above-identified patent and that said Letters Patent is hereby corrected as shown below:

COLUMN 1

Line 40, "56-130763" should read --56-130723--.

COLUMN 5

Line 62, "deferent shapes each other" should read
 --different shapes from each other--.

COLUMN 8

Line 37, "least;" should read --least:--.

COLUMN 9

Line 18, "a" (second occurrence) should read --an--;
Line 22, "a" (second occurrence) should read --an--;
Line 26, "a" should read --an--;
Line 27, "a" (second occurrence) should read --an--;
Line 31, "claim 1" should read --claim 1, comprising--;
Line 37, "least;" should read --least:--.

UNITED STATES PATENT AND TRADEMARK OFFICE
CERTIFICATE OF CORRECTION

PATENT NO. : 5,777,779

DATED : July 7, 1998

INVENTOR(S): SHIGERU HASHIMOTO ET AL.　　　　Page 2 of 2

It is certified that error appears in the above-identified patent and that said Letters Patent is hereby corrected as shown below:

<u>COLUMN 10</u>

Line 22, "comprising;" should read --comprising:--.

Signed and Sealed this

Fourth Day of May, 1999

*Attest:*

*Attesting Officer*

Q. TODD DICKINSON

Acting Commissioner of Patents and Trademarks